United States Patent [19]
Van Steenbrugge

[11] Patent Number: 5,222,746
[45] Date of Patent: Jun. 29, 1993

[54] PROTECTIVE BELLOWS FOR UNIVERSAL JOINTS ALLOWING RAPID INSTALLATION

[75] Inventor: Marcel Van Steenbrugge, Wortegem-Petegem, Belgium

[73] Assignee: Brian Technics, Oudenaarde, Belgium

[21] Appl. No.: 817,485

[22] Filed: Jan. 7, 1992

Related U.S. Application Data
[63] Continuation of Ser. No. 403, Mar. 4, 1991.

[30] Foreign Application Priority Data
Mar. 7, 1990 [BE] Belgium ............................. 9000251

[51] Int. Cl.⁵ ............................................ F16J 15/54
[52] U.S. Cl. ............................ 277/212 FB; 277/221; 74/18; 403/50; 464/175
[58] Field of Search ............... 277/212 FB, 220, 221, 277/222; 138/121; 464/173, 175; 74/18, 18.1, 18.2; 285/226; 403/50

[56] References Cited

U.S. PATENT DOCUMENTS

| | | | |
|---|---|---|---|
| 2,226,388 | 12/1940 | Richter | 74/18.1 |
| 3,638,503 | 2/1972 | Stipanovic et al. | 74/18.2 X |
| 4,558,869 | 12/1985 | Grove et al. | 277/1 |
| 4,560,178 | 12/1985 | Hempel | 277/212 FB |
| 4,786,272 | 11/1988 | Baker | 277/212 FB |
| 4,813,913 | 3/1989 | Better | 277/212 FB |
| 4,819,919 | 4/1989 | Taylor | 277/212 FB X |
| 4,895,550 | 1/1990 | Baker | 277/212 FB |
| 5,027,665 | 7/1991 | Hayward | 277/212 FB X |

FOREIGN PATENT DOCUMENTS

| | | |
|---|---|---|
| 706519 | 5/1941 | Fed. Rep. of Germany . |
| 1245236 | 7/1967 | Fed. Rep. of Germany ...... 277/212 FB |
| 0605360 | 5/1926 | France ................................ 277/220 |
| 8505421 | 12/1985 | PCT Int'l Appl. . |
| 2196396 | 4/1988 | United Kingdom ................ 403/50 |

Primary Examiner—William A. Cuchlinski, Jr.
Assistant Examiner—James K. Folker
Attorney, Agent, or Firm—Shlesinger, Arkwright & Garvey

[57] ABSTRACT

Rapid-assembly sealing bellows for protecting jointed couplings such as transmissions, guiding and steering joints, in particular so-called cardan or universal joints of motor vehicles, said bellows being essentially a corrugated tubular body (with entry and exit sleeves) from a material of adequate flexibility, comprising at least one jointing closure formed by lateral interlocking of the near divided edges running in the longitudinal direction from entry to exit of said tubular body, each of said edges forming respectively a U-shaped interlock housing and an interlocking tongue for being received in the housing, characterized in that the open end of the interlock housing comprises an upper covering leg which is inclined in the upward direction and a supporting sole forming a lower covering surface which greatly extends beyond the upper surface and which is inclined in the downward direction, and in that the interlocking tongue, which is closely received into the U-shaped housing by the matching interior surfaces thereof and presents the same surface inclinations as the housing but in opposite sense, comprises depth abutments which lean respectively against the open end face of the upper leg and against the end face of the lower supporting sole, and in that the opposite outer faces of the interlock housing and the entering tongue, when assembled, are inclined in the opposite direction so as to form facing breaker surfaces which act as jet breakers of projected rain water in both rotational directions.

20 Claims, 7 Drawing Sheets

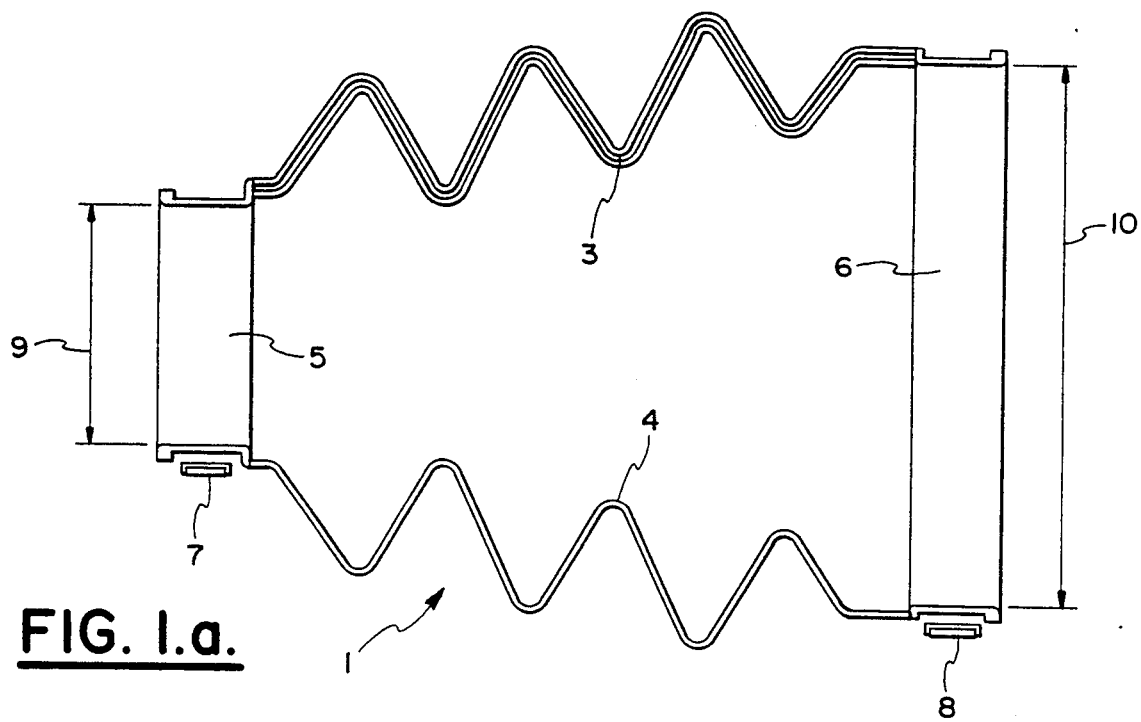
FIG. 1.a.
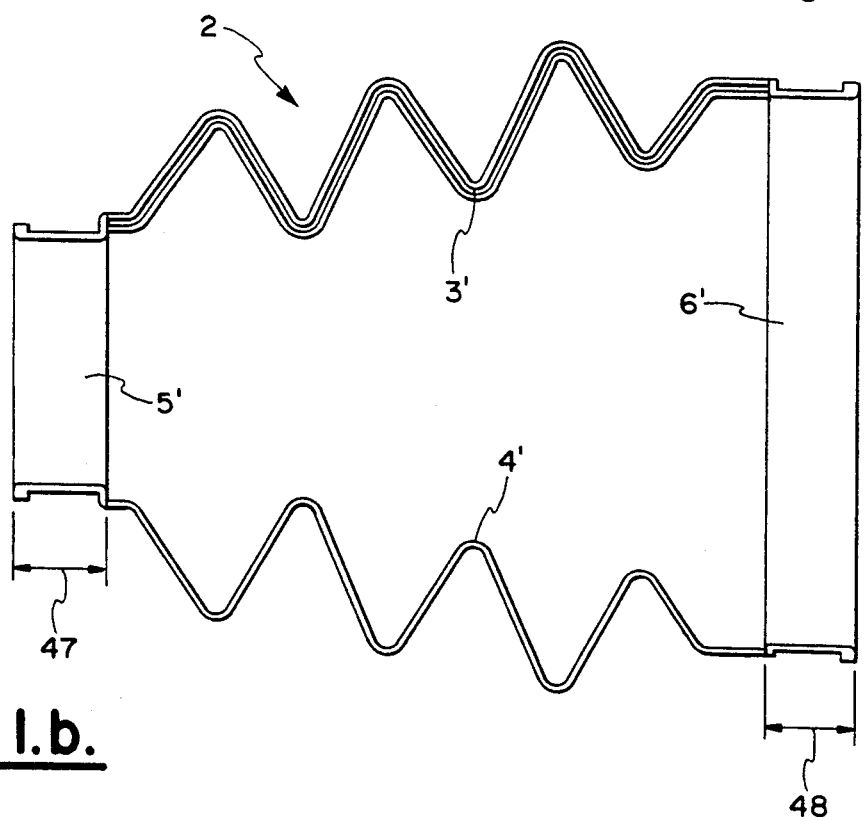
FIG. 1.b.

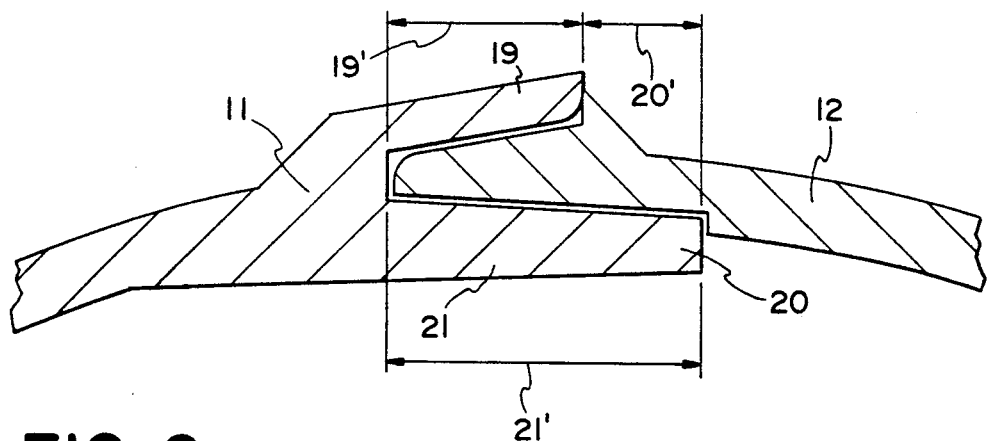
FIG. 2.a.
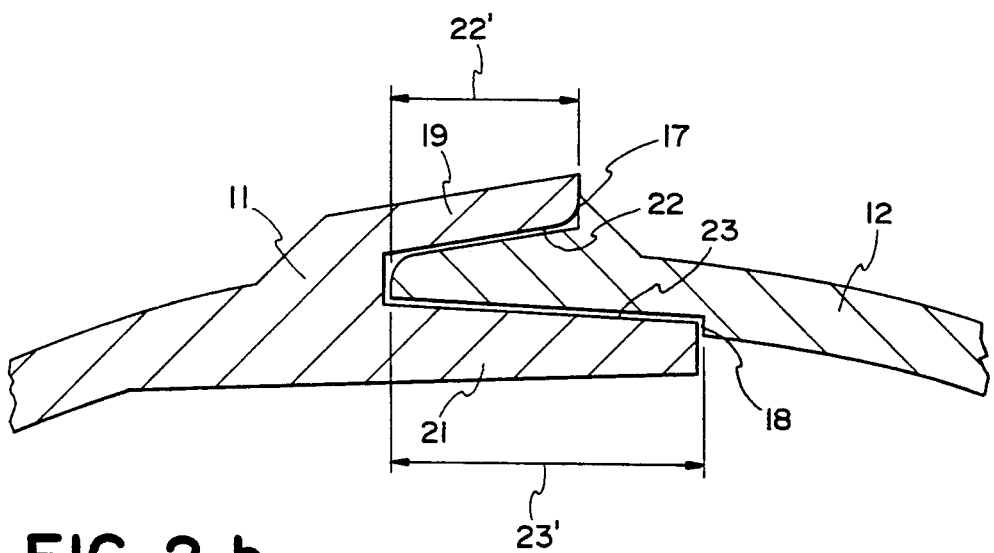
FIG. 2.b.
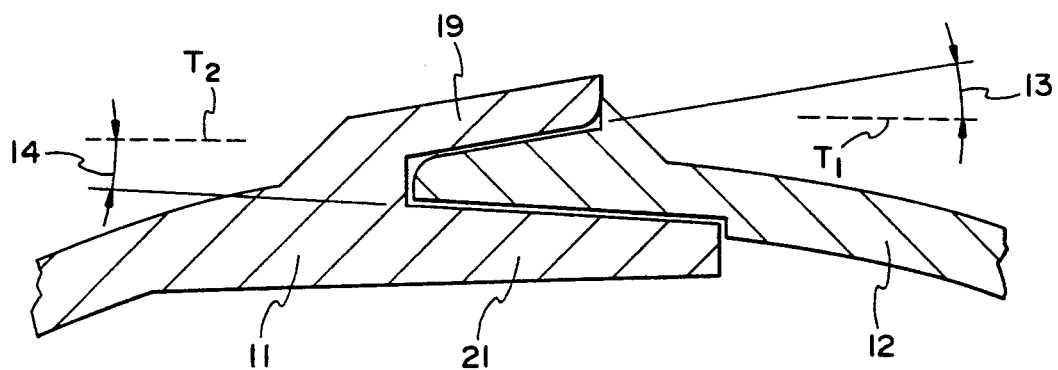
FIG. 2.c.

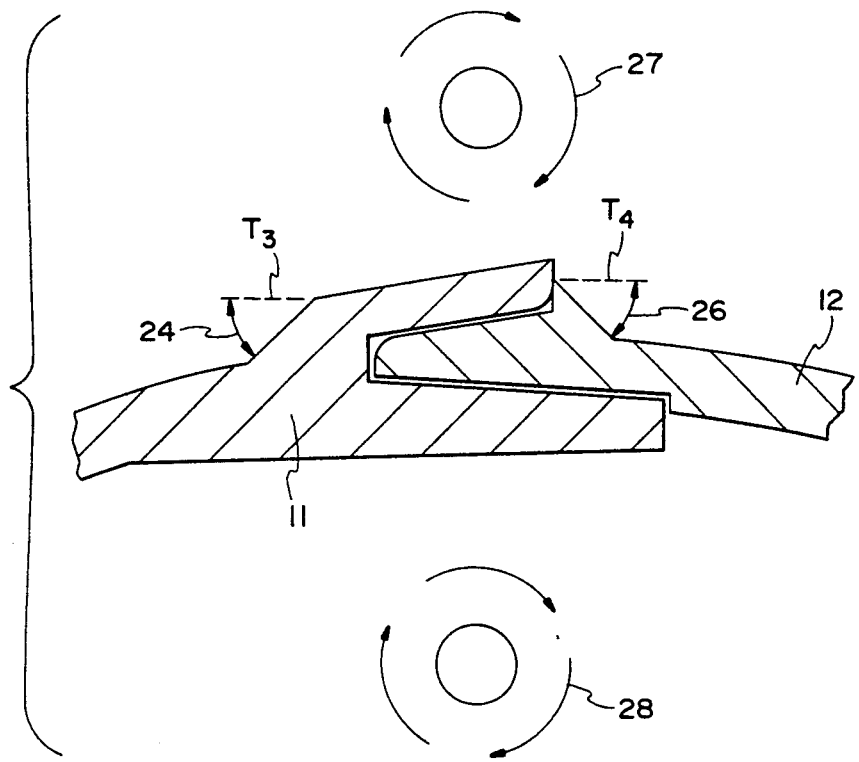
FIG. 2.d.
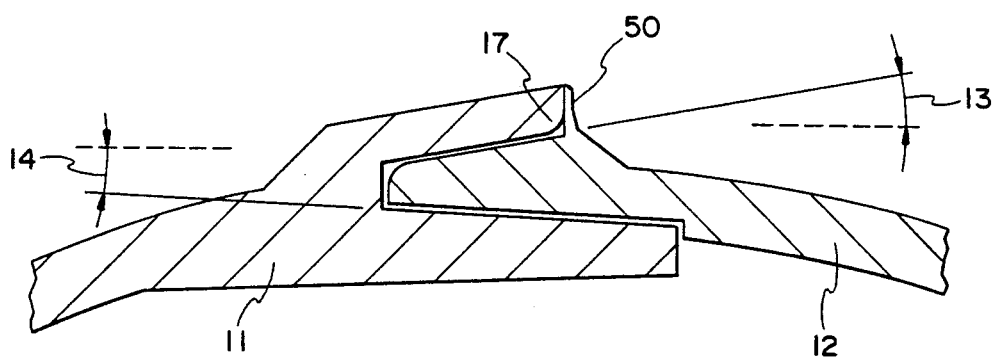
FIG. 2.e.
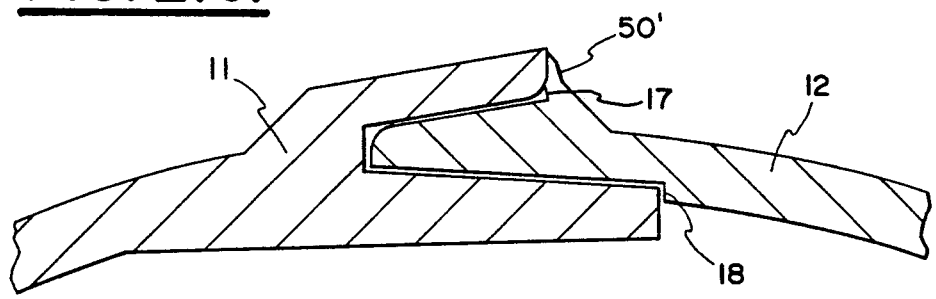
FIG. 2.f.

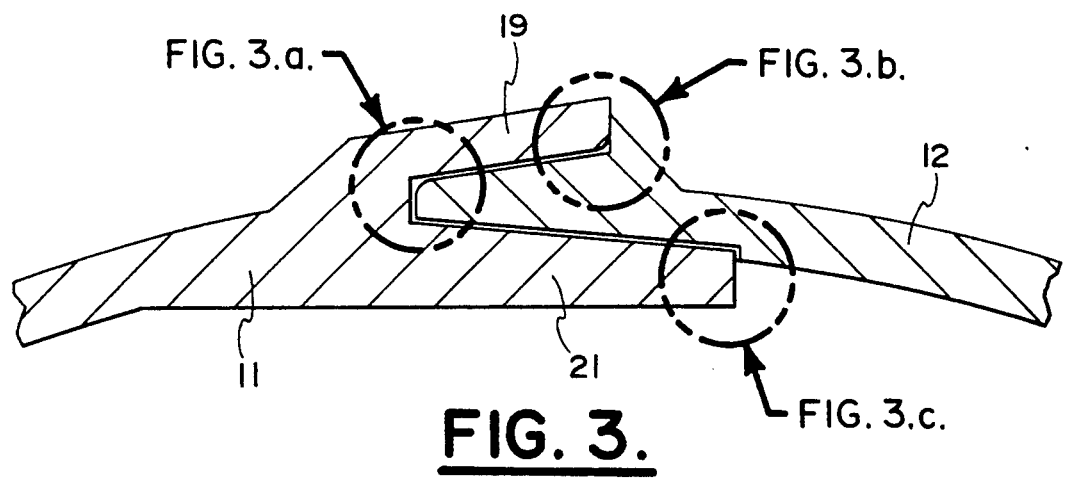
FIG. 3.
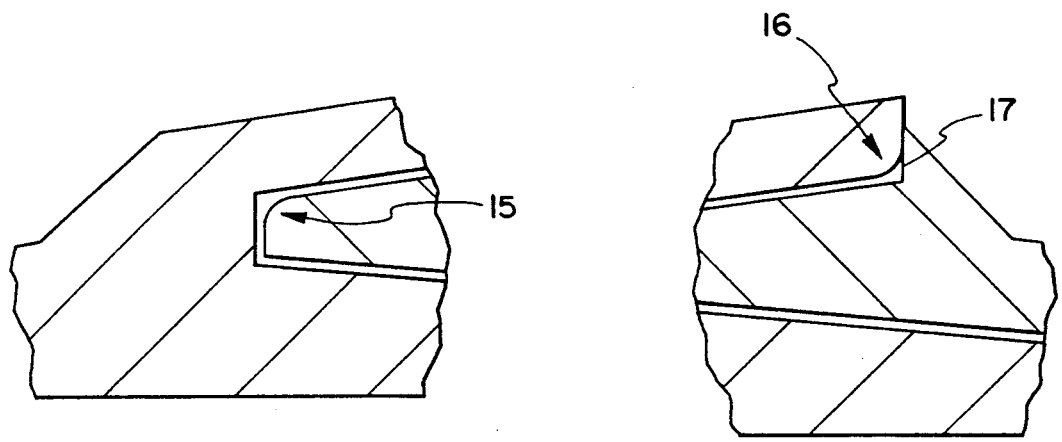
FIG. 3.a.
FIG. 3.b.
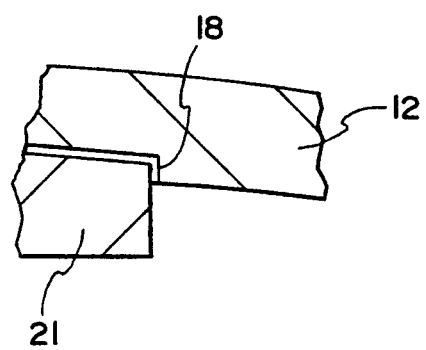
FIG. 3.c.

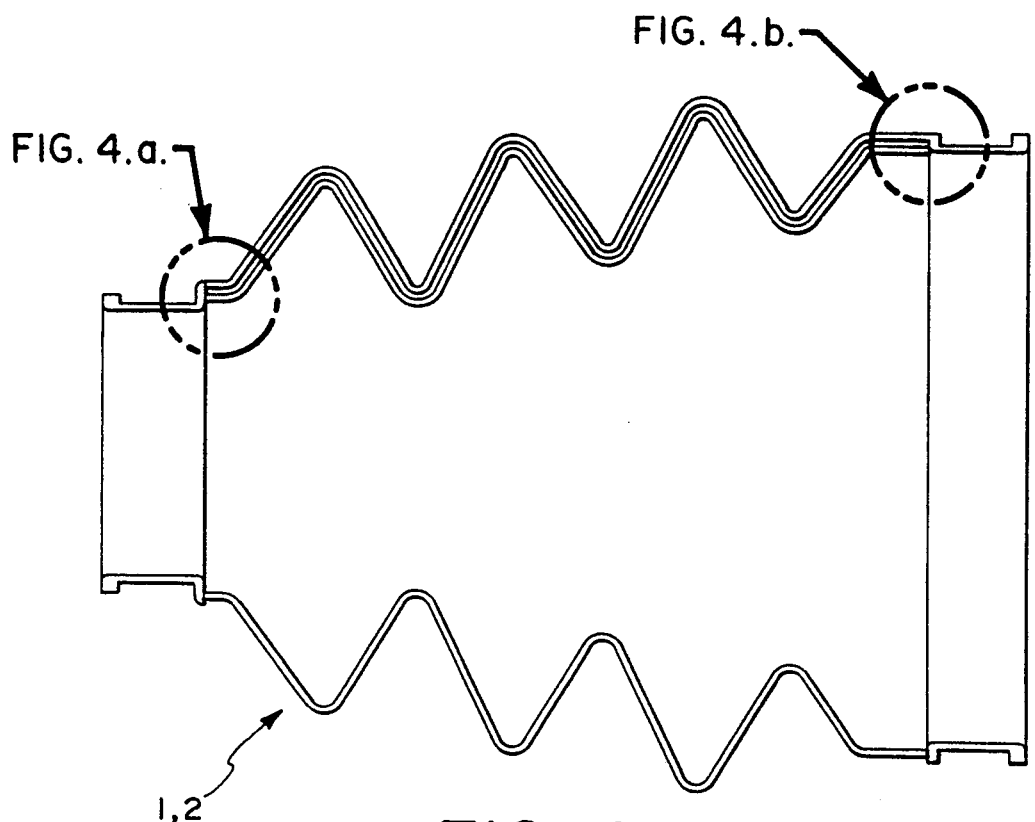
FIG. 4
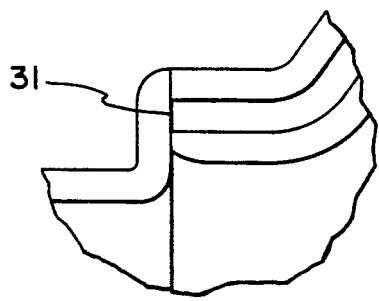
FIG. 4.a.
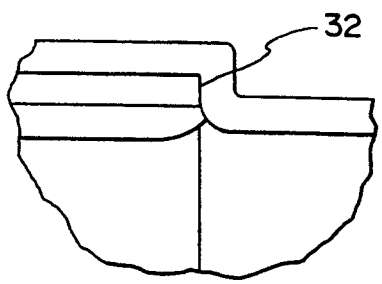
FIG. 4.b.

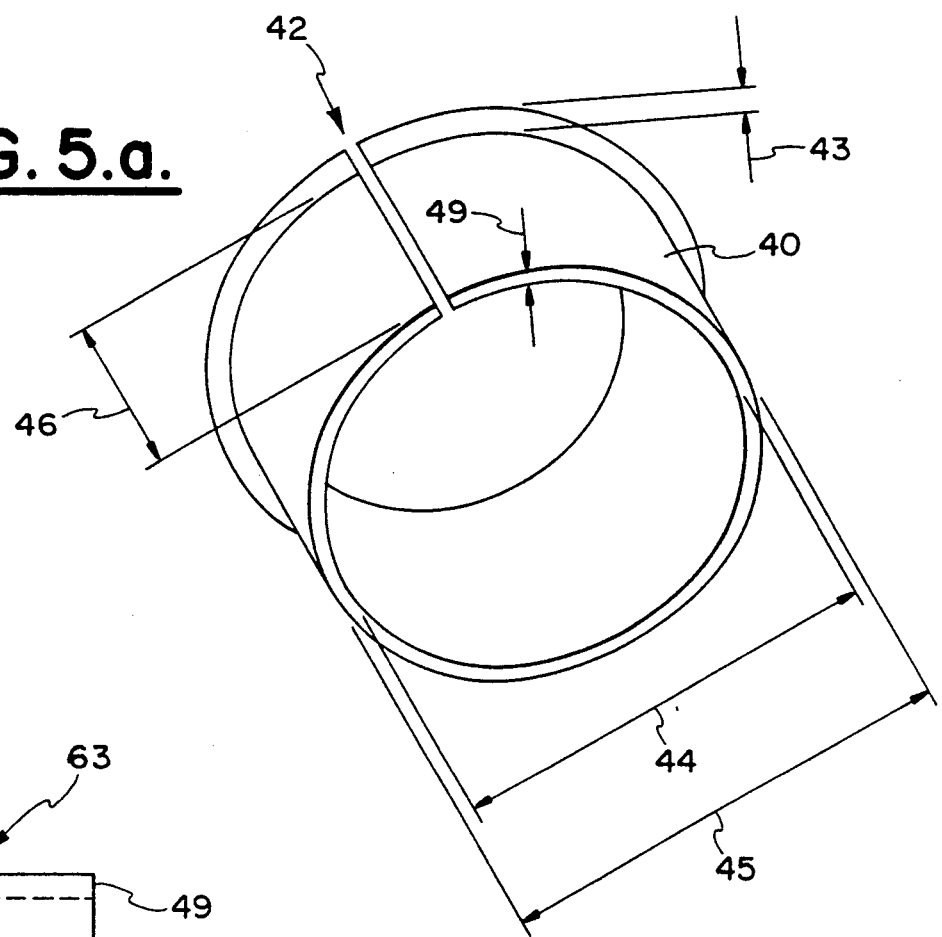
FIG. 5.a.
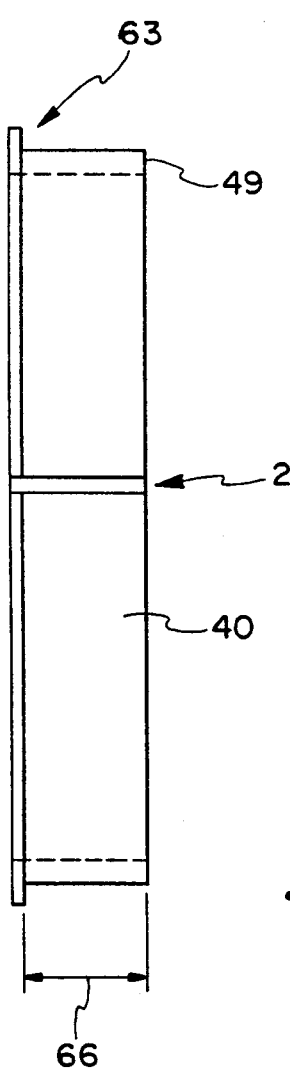
FIG. 5.b.

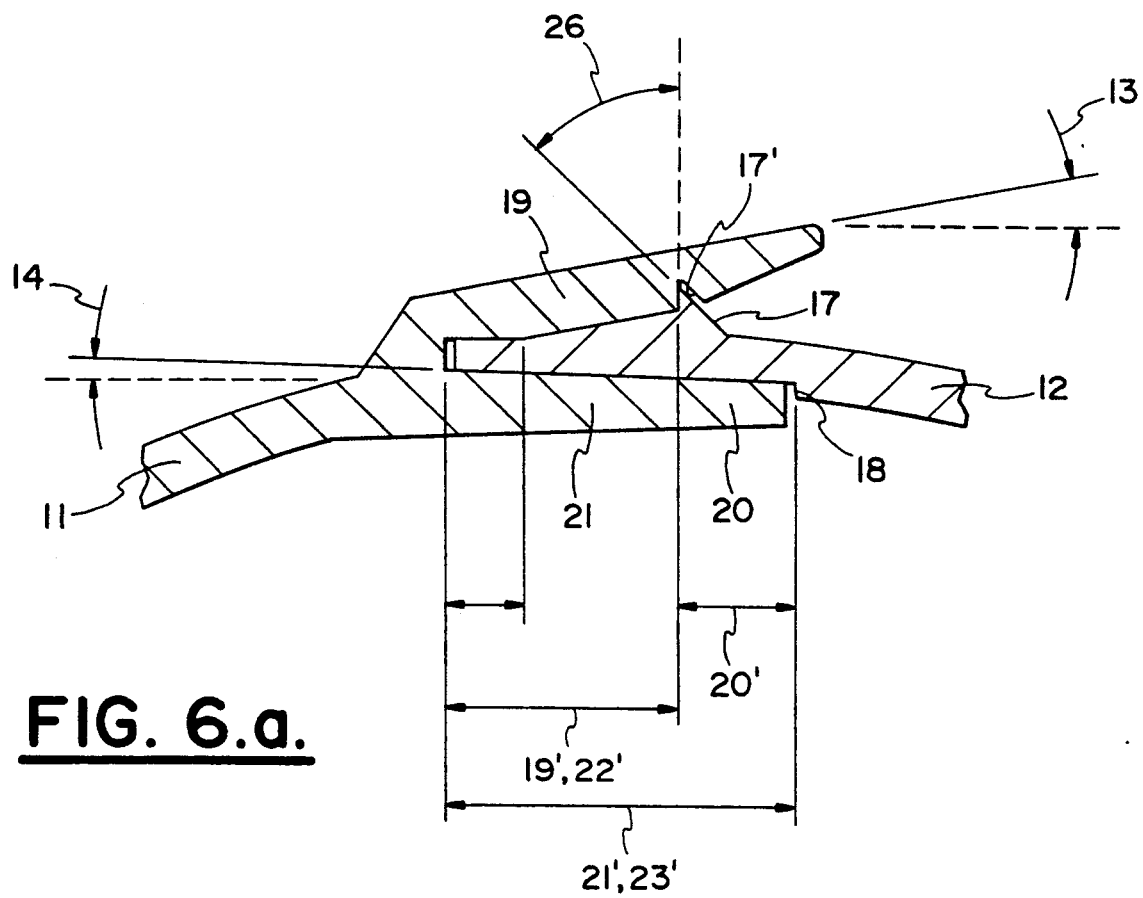
FIG. 6.a.
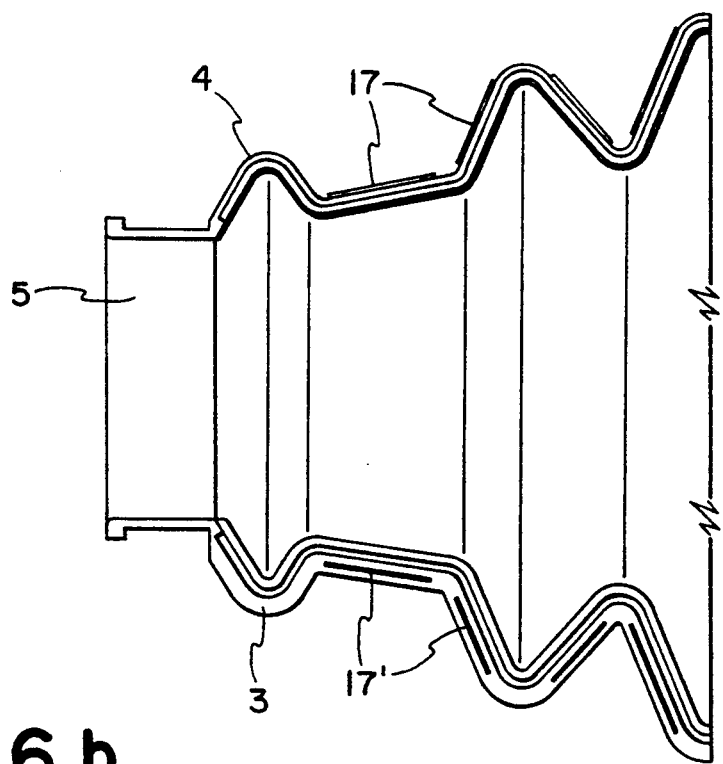
FIG. 6.b.

PROTECTIVE BELLOWS FOR UNIVERSAL JOINTS ALLOWING RAPID INSTALLATION

This application is a continuation-in-part of U.S. patent application Ser. No. 07/781,162filed Jan. 7, 1992, which claims the priority of International Application No. PCT/EP91/00,403, filed Mar. 4, 1991, and which claims the priority of Belgian Application No. 9,000,251, filed Mar. 7, 1990.

FIELD AND BACKGROUND OF THE INVENTION

The present invention relates in general to a tightly sealable fold collar or bellows enabling a quick assembly for protecting thereby universal joints, steering and guiding axle couplings, which bellows possesses a longitudinal sealing closure and is particularly suitable for protecting swing axle rotating joints (cardan joints) of motor vehicles.

More in particular the present invention concerns a protective bellows adapted to be quickly installed on a homokinetic "CARDAN" type universal joint of motor vehicles, said bellows comprising two bodies in the form of shell halves which are assembled together by means of a fitting system with simultaneous gluing.

On motor vehicles the bellows covering the cardan joint is of hermetically closed design for grease- and oil tightness such that the joint is protected against damage and corrosion. The conventional CARDAN bellows being constructed as a one-part body necessitates its installing to be carried out simultaneously with the assembly of the universal joint and hence its replacement in case of a defect, for instance a cut or a tear or a porosity leak, compels the operator to entirely take off the cardan joint, which gives rise to a considerable loss of time.

In order to overcome this drawback it has been recommended to manufacture a protective bellows having a sealable closure of the kind with snap-locked jointing edges. Such a bellows allowing rapid installment is known for instance from U.S. Pat. No. 4,558,869.

These models as a whole comprise a lateral opening extending in the longitudinal direction for allowing the entry of the coupling axle without need of disconnecting the cardan joint. They are assembled together by an interlocking system with "U"-shaped edge and matching lip, the hole being sealed by wedding or gluing. The joint of conventional design with "U"-shaped edge and inserted lip has the disadvantage of causing a local overthickness and a sudden change in the rigidity of the bellows body. These jointing closures necessarily have a lower flexibility than that of the bellows shell and as a consequence the latter no longer provides in every direction the same flexibility or fitness to dissipate the alternating compressive and tensile bending stresses when in use.

Moreover temperature variations, particularly in winter when ambient temperatures may be as low as minus 20° C. or even lower, give rise to stiffening of the plastic or elastomeric material of the tubular body, which shows a greatly pronounced increase and variation of ridigity in the region of the closing joint.

In addition to this problem the known bellows generally display an interlocking closure of rather poor design which is not adapted to ensure a sufficiently long service life of the welded or glued joint, and this in the light of the geometry of the interconnected edges and the tenacity of the finished closure. Thus it has been established that known protective bellows are not satisfactory from the viewpoint of durability and watertightness. In normal use conditions the jointing closure itself tends to loosen prematurely. In extreme conditions (low temperatures) the bellows looses at the place of the interlocking closure its elasticity needed withstand high loads occurring when applying full lock upon turning the vehicle, which may make appear fissures through which grease will escape such that the cardan joint is bound to degrade in the long run.

On the other hand the U-shaped interlocking closure extending longitudinally from one bellows end to the opposite end, as shown opened for closing the bellows after the latter has been positioned, must sustain in rainy weather the direct hit of water projected in continuous jets which are augmented by the speed of rotation and hence increase the penetration force of the water. Moreover, the glue used in the gluing step after the interlocking operation exerts a dissolving action upon the interlocked tongue and a welding effect by solvent aided fusion of the material. A drawback thereof consists in the fact that, when the operator doesn't watch carefully the overflowing of the solution, the latter may cause dissolution of the bellows material on places when it's not desirable. As a result perforations may develop at solvent deposit spots, so that the bellows is no longer watertight.

In addition it has to be understood that for adapting the so-called standard system in order to be realizable on all types of European motor vehicles, it's necessary to have different opening diameters available for the bellows, namely one opening end for the wheel side the diameter of which may vary from 66 mm to 91 mm, and likewise for the axle or tube side with a diameter varying from 20 to 40 mm. A disadvantage of existing rapid-assembling protective bellows consists in the absence of opening diameters which are adaptable for vehicles having a diameter which is larger than 81 mm on the wheel side.

OBJECTS AND SUMMARY OF THE INVENTION

The present invention has for its object to overcome these drawbacks and to provide a novel and particularly efficient design of a rapid-assembly bellows that is adaptable to any type of universal cardan type joints of motor vehicles.

Another object of the invention is to solve all the above mentioned problems, including the selection of the raw material where the bellows is composed of and the glue application.

The invention further provides a method of assembling or installing a bellows according to the invention upon a cardan type joint.

The present invention having as its main object to overcome the disadvantages due to the closure systems and forms of known bellows, thus also proposes a solution to the problems linked with the materials constituting the jointing closure of the bellows.

Still another object of the invention consists in providing a rapid-assembly bellows of a geometry which is easily adaptable to the coupling axle diameters around which the bellows is installed. In addition, the bellows of the invention aims to remedy the problem of water projections in continuous jets, e.g., in rainy weather, which are enhanced by the revolving speed and which tend to deteriorate the side edges of the interlocking closure, thereby finally weakening and breaking the watertight sealing closure protecting the cardan joint. In order to overcome the above cited problems, the invention proposes a protective bellows for universal joints which is essentially characterized by the combination of technical features as follows: Rapid-assembly sealing bellows for protecting jointed couplings such as transmissions, guiding and steering joints, in particular so-called cardan or universal joints of motor vehicles, the bellows being essentially a corrugated tubular body (with entry and exit sleeves) from a material of adequate flexibility, comprising at least one jointing closure formed by lateral interlocking of the near divided edges running in the longitudinal direction from entry to exit of the tubular body, each of the edges forming respectively a U-shaped interlock housing and an interlocking tongue for being received into the housing, characterized in that the open end of the interlock housing comprises an upper covering leg which is inclined in the upward direction and a supporting sole forming a lower covering surface which greatly extends beyond the upper surface and which is inclined in the downward direction, and in that the interlocking tongue, which is closely received into the U-shaped housing by the matching interior surfaces thereof and presents the same surface inclinations as the housing but in opposite sense, comprises depth abutments which lean respectively against the open end face of the upper leg and against the end face of the lower supporting sole, and in that the opposite outer faces of the interlock housing and the entering tongue, when assembled, are inclined in the opposite direction so as to form facing breaker surfaces which act as jet breakers of projected rain water in both rotational directions.

Preferred embodiments of the present invention are defined as set forth in detail below.

The bellows according to the invention may be formed of suitable material possessing the flexibility and tenacity required for the envisaged application and having in addition a sufficient general corrosive resistance and also withstanding attack by hydrocarbons, in particular motor oils, brake circuit oils, motor fuel, etc ....

Although a bellows may also be manufactured from a corrosion resistant metallic material, it's recommended to utilize plastic or synthetic materials, such as for example polyethylenes, polypropylenes and preferably thermoplastic elastomeric material, and most preferably thermoplastic polyurethanes.

A particularly preferred material is PEBAX 4033, which is a member of the thermoplastic elastomers family of the type polyether-block-amide. The bellows of this invention may be shaped by any suitable process of making, such as for instance by cast/molding, by blowing or by injection molding. A preferred bellows material like PEBAX 4033 is advantageously shaped by injection molding.

BRIEF DESCRIPTION OF THE DRAWINGS

Other characteristics and advantages of the invention will be better understood from the following description and the exemplified embodiments. The invention will be described into more detail with the help of a preferred embodiment illustrated in the annexed drawings, without limiting the invention thereto, in which:

FIGS. 1a and 1b are axial cross-sectional views of the two shell bodies forming together a bellows according to the invention.

FIGS. 2a-2f show transverse cross-sectional views of an interlocking joint or closure of a bellows according to the invention.

FIG. 3 shows different technical details of an interlocking closure of this invention.

FIGS. 3a-3c illustrate portions of FIG. 3 on an enlarged scale.

FIG. 4 is a longitudinal cross-sectional view of a bellows shell half, showing in more detail the finishing shape of the opposite closed and faces.

FIGS. 4a and 4b illustrate portions of FIG. 4 on an enlarged scale.

FIGS. 5a-5b illustrate a sealing joint ring useful for adapting the bellows entries to given diameters of wheel and/or coupling axles to be protected.

FIGS. 6a-6b show additional improvement aspects to the interlocking jointing closure.

DETAILED DESCRIPTION OF THE INVENTION

In FIG. 1 there is shown a bellows exemplifying a preferred embodiment of the invention. The bellows is composed of two shell body halves (1) and (2) having a convenient corrugated or wave form. After assembling the two shells by interlocking their corresponding respective longitudinal side edges (3,4') and (4,3'), the so installed and sealed shells form a resilient and oiltight bellows around a cardan shaft coupling.

The two opposite ends (5,6) of the installed bellows form tubular attachment sleeves for receiving and enclosing the two connected sides (e.g., wheel, shaft) of the protected cardan coupling joint.

The inside diameters (9, 10) of the coupling sleeves are adapted and/or are subsequently adaptable to the diameters of the cardan coupling components. The peculiar concept of the actual longitudinal jointing closure of the bellows or its two opposite closures in the case of the preferred embodiment of the invention composed of two hemispherical shell halves, offers novel technical elements of an unexpected effectiveness which form the basis of the present invention. These elements are shown into more detail in FIGS. 2 and 3.

Unlike conventional closures where the two longitudinal side edges to be connected consist of a simple U-shaped channel and a lip that are mutually interlocked, the jointing closure according to the invention is characterized by a particular construction of the two edges forming the interlocking sealing closure. The FIGS. 2a to 2d, illustrating different transverse cross-sectional views of a longitudinal jointing bellows closure according to the invention, show the technical details by which the drawbacks are solved occurring with a common interlocking closure of adjacent fitting edges. The sealing connection between the semi-tubular parts of the two end sleeves (5,6) disposed at each end opening of the corrugated body may also be accomplished by a usual U-shaped interlocking closure.

It should be noted that the terms upper/lower and radially outward/radially inward are used for convenience and clarity when viewing the drawing figures in connection with the written description. As will be readily apparent from looking at the figures, given the overall configuration of the bellows according to the invention, a section of the interlocking closure which extends radially outwardly at one point on the outer surface of the bellows may be extending radially inwardly in a succeeding section.

The longitudinal interlocking structure is formed of an interlock base or housing (11) and of an interlocking tongue element (12). The interlock base (11) which is open ended towards the tongue (12) comprises an upper as viewed in FIGS. 2a–2f (i.e., radially outer) covering leg (19) and a lower (i.e., radially inner) supporting sole (21) having a covering surface (21') extending beyond (i.e., circumferentially past) that of the upper leg surface (19') by an overshoot part (20) of a length (20') being equal to at least a quarter of covering depth (19'). The interlocking tongue (12) which forms the male part of the joint structure, comprises an upper part (22) and a lower part (23) (i.e., radially outward and inward, respectively) which exactly match the internal surfaces (19,21) of the interlock housing. For achieving this, upper part (22), respectively lower part (23) of the tongue are each provided with an edge portion (17, 18) that acts as a depth controlling abutment. Another particularity of the interlocking system concerns the different and opposed inclination (13,14) of the internal covering surfaces (19,21) of the housing (11), and likewise that of the corresponding contact surfaces of upper (22) and lower part (23) of the interlocking tongue (12). The covering surface (19) is inclined at an angle (13) of about 5 to 20 degrees, preferably about 10 degrees, to make the entry of tongue (12) easier. Angle (13) is measured relative to a tangent plane $T_1$ which extends tangential to the interlocking closure. The supporting sole (21) is sloped at an opposed angle (14) of about 1 to 6 degrees, preferably about 3 degrees of opening, relative to a tangent plane $T_2$ substantially parallel to tangent plane $T_1$, to facilitate the insertion of interlocking tongue (12), see FIG. 2c.

Another advantageous measure for improving the assembled jointing closure according to the invention is the provision of a hit attack angle (24,26), including at about 30 to 50 degrees, preferably about 45 degrees, relative to a tangent plane $T_3$ on the opposed outer ends (outer closed side of interlock base, resp. interior side of tongue) of the interlock joint. Said inclined surfaces, sloped in opposed directions, have the effect of forming jet breakers, i.e. to counteract in rainy time the water protecting impact that might attack and impair the finished sealing closure. The jet break (24) is operative from the moment on that the rotation is effected in the sense (28). The same effect is obtained for jet breaker (26) inclined relative to a tangent plane $T_4$ at essentially the same angle as (24) but in the opposite sense, when the rotation is started in the direction (27). The constructional and geometric features by the longitudinally interlocked nesting of the mating side edges of the bellows according to this invention, as described and explained above, result in the formation of a strong and accurate jointing closure, easy to assemble and resistant to projected water.

In addition the geometric shape of the assembled interlocking joint avoids a local overthickness being excessive and too abrupt. In this way the bellows according to the invention has a better flexibility and an improved resistance to alternating flexing loads as compared to bellows of the prior art.

An additional important object of the novel interlocking joint system is to overcome the problems related to welding and/or gluing the constituent near elements of the jointing closure, with the aim of achieving a strong, watertight and durable adhesive connection. For this purpose there is first provided, see FIG. 3, an interlock fitting that is accurate in its depth thanks to abutments (17,18), which enables to achieve a uniform thickness of the adhesive layer joining the glued upper (19,22) and lower (21,23) constituent parts which perfectly fit together in the assembled interlocking structure. In addition the adhesive joint between the covering surfaces possesses at least one security seam in the length direction of the joint assembly. It can be seen that the angle (15) at the entering end face of the tongue (12) has been omitted with the aim of creating an empty space, for example of about 0.1 mm, which will be automatically filled by the applied glue thereby forming a secure joining seam. The angle (16) facing the abutment (17) has the same function as element (15). Although said two seams are largely sufficient, it is still possible to provide a similar seam at the other entering end angle of the tongue and at the lower part of the interlocking tongue facing the abutment (18).

FIG. 4 illustrates a further special feature of the bellows according to the invention. At the two opposite sides of the corrugated bellows body there is the provision of terminal closure walls (31) and (32) which are each disposed at the opposing end faces of the interlocking base (11). These closure walls enable to guide the interlocking tongue (12) during assembly of the shell halves (1) and (2) in such a manner that a shift in the longitudinal direction is avoided, by which snap-locking of the interlocking tongue is obtained without positioning error. The present invention is also aimed at solving the drawbacks related to the difficulty of so-called standard adaptation of the bellows, to allow its installment on all the motor vehicles of type VL and on industrial vehicles. Indeed, the conventionally used bellows have the disadvantage that they are not available in the range of end opening diameters exceeding 81 mm at the wheel entry side.

The present invention overcomes this difficulty by providing a number of base models (for instance four) of rapid-assembly bellows having the following end opening diameters at the wheel side and the shaft entry side.

Model I

Once the two shell halves (1) and (2) are assembled together, the inner diameter of the bellows is 75 mm at the wheel side (10) and 32 mm at the shaft side (9).

Model II

Once the two shell halves (1) and (2) are assembled together, the inner bellows diameter is 78 mm at the wheel side (10) and 45 mm at the shaft side (9).

Model III

Once the two shell halves (1) and (2) are assembled together, the inner bellows diameter is 88 mm at the wheel side and 44 mm at the shaft side.

Model IV

Once the two shell halves (1) and (2) are assembled together, the inner diameter of the bellows is 94 mm at the wheel side and 43 mm at the shaft side.

For these base models of a rapid-assembly bellows there is additionally the provision of joint adapter rings (40), see FIG. 5. The purpose of said adapter rings is on one hand to achieve hermetically closed bellows connections simultaneously at the wheel and the shaft side, and on the other hand to decrease the diameter of the two end openings of the bellows, such that the bellows is capable of a larger range of adaptations or applications.

Hence a wide series of adapter rings of different thicknesses is made available to adapt a bellows model according to demand.

As represented in FIGS. 5a and 5b, the joint ring (40) is of a spherical shape, with a split cut in the axial direction (42,29) for facilitating its installment. It is provided with a circular shoulder element (43,63) which has the function of an exterior abutment. The axial length or width (46,66) is equal to the standard depth of the bellows entry openings (47) and (48). The exterior diameter (45) of the adapter joint is equal to either the inner bellows diameter (10) for the series wheel side joint, or to diameter (9) for the series shaft side joint. Only the inner diameter (44) or the thickness (49) will vary in order to realize the required adaptation.

FIGS. 6a-6b illustrate a few additional improvements to the interlocked jointing structure. As shown in FIG. 6a the upper abutment 17 has a double function of depth control and snap-locking of the inserted tongue 12 which is now retained by a corresponding recess 17' provided in upper leg 19. In this way the assembling operation is rendered still easier and more accurate. More importantly, the applied adhesive will now uniformly harden and form a strong joint in geometrically and mechanically stable conditions.

A further improvement may consist in providing the inclined tongue with a lip shaped small extension, the upper surface of which is nearly parallel to the lower (sole) surface.

FIG. 6b shows a longitudinal cross-section of a bellows shell half provided with the snap-locking add on explained in FIG. 6a. As can be seen the snap-locking measure is provided on the rectilinear parts between the wave crests and roots of the corrugated body. In this way of molding of a more complex body shape is rendered more efficient without losing the technical effectiveness of the additional feature with respect to the interlocking/assembling operation, achievable joint strength and related quality/reliability of the formed sealing connections.

A specific base example of a rapid-assembly bellows according to the invention consists of two hemispherical shell halves of corrugated shape. Their corresponding near edges extending in the longitudinal direction to form the open-ended interlock base and the entering tongue which will be assembled so as to obtain two diametrically opposed longitudinal jointing closures having advantageously the following dimensions:

The interlocking base (11) comprises a covering surface (19) of 3 mm depth at its upper side and a supporting sole of 5 mm length at the lower side. The upper surface (19) is inclined with an opening angle of 10 degrees. The inclination of the sole (21) corresponds to an opening angle of 3 degrees. The upper face (22), resp. lower surface (23) of the interlocking tongue (12) which fit the inner surfaces of the interlock housing (11) feature essentially the same opening angles as indicated above. The attack angle (24,26) has a slope of 45 degrees. The edge angle (15) at the end face of the entering tongue, and also angle (16) located on the end side of the interlock base facing the abutment (17), have been omitted to form an empty space equal to 0.1 mm for the purpose of constituting two adhesive security seams. The outer part (50,50') of abutment (17) may be finished so as to cover the end face of the upper leg of the interlock base (11) over its entire height, thereby forming a smooth and properly closed transition between interlock base and interlocking tongue (see FIGS. 2e and 2f).

Furthermore, the invention concerns the use of a method of installing a rapid-assembly bellows as described hereinabove. The description hereinbelow explains in detail the installment of a bellows according to this invention upon a cardan type universal joint in real practice conditions.

The first operation consists in disassembling the defective bellows from the cardan joint, and in completely cleaning the cardan coupling and recovering it with specific grease.

After this step, the two shell halves (1) and (2) corresponding to the cardan diameters are disposed around the cardan joint.

Then glue is applied into the groove channel (3') of interlock housing (11) of shell half (1). The same operation is carried out on the exit and entry sleeves.

Once this first connection is completed, the bellows presents a longitudinal opening along (3,4') which allows the passage of the coupling shaft. Afterwards the side edges (3) and (4') are assembled together in the same way as (3') and (4). The thus assembled bellows looks then like a conventional watertight cardan bellows.

Then one proceeds with the installment of the sealing joint at the wheel side. The split opening (42) allows its mounting.

The annular joint is encased in opening (10) after application of glue onto parts (63) and (66) and to the two lips of cut opening (42).

The shoulder (63) is disposed onto the outer flange of opening (10). The depth (66) of the sealing ring is inserted so that it is pressed against inner circular ridge (8).

The watertight fit at the shaft side is achieved in the same manner with a sealing ring of a diameter corresponding to that of the shaft. After glue application onto parts (63) and (66) and to the two lips at opening (42) the shoulder (63) is positioned to rest against the exterior flange opening (9). The depth (66) of the sealing ring is fitted so that it's clamped against circular inner ridge (7).

The last operation consists in placing the bellows into its final position for protecting the cardan joint. The two end sleeves of the bellows are secured by means of a tension collar (7,8) of stainless steel.

At the wheel side the collar is retained in a groove (6) and is tensioned for its final tightening. At the shaft side the collar rests in grove (5) and is likewise finally tightened. It will be obvious that the invention is not limited to the exemplifying embodiments described above and illustrated in the drawings, for which invention one could provide several modifications without departing from the scope of the invention as defined in the appending claims.

I claim:

1. A rapid assembly, flexible, sealing bellows for protecting jointed couplings, said bellows comprising:
   a) a tubular body;
   b) at least one jointing closure defined by adjacent divided edges of said tubular body;
   c) a first one of said edges defining a U-shaped interlock housing;
   d) said interlock housing including:
      i) a radially outer covering leg which is inclined in a radially outwardly extending direction, which defines a radially outer covering surface, and which has an end face; and ii) a supporting sole defining a radially inner covering surface which extends circumferentially beyond said radially outer covering surface, which is radially inwardly inclined, and which has an end face;

e) a second one of said edges defining an interlocking tongue receivable in said interlock housing;

f) said interlocking tongue including:
i) a radially outer depth abutment which abuts said end face of said outer covering leg; and
ii) a radially inward depth abutment which abuts said end face of said supporting sole;

g) means for defining water jet breakers, said water jet breaker means including:
i) a radially outwardly inclined outer face disposed on said interlock housing; and
ii) a radially inwardly inclined outer face disposed on said interlocking tongue; and h) wherein, when said interlocking tongue is received in said U-shaped interlock housing, said radially outwardly inclined outer face functions as a water jet breaker surface for rain water projected in a first rotational direction, and said radially inwardly inclined outer face functions as a water jet breaker surface for rain water projected in a second rotational direction, the second rotational direction being opposite to the first rotational direction.

2. A bellows as defined in claim 1, wherein:
a) said tubular body includes two hemispherical, semi-tubular shell halves;
b) entry and exit sleeves are disposed on said tubular body;
c) said at least one jointing closure includes a first closure and a second closure;
d) said first closure is substantially diametrically opposed to said second closure; and
e) said first and second closures extend into said entry and exit sleeves.

3. A bellows as defined in claim 1, wherein:
a) said interlocking tongue includes an end face;
b) an adherent security seam is disposed between said U-shaped interlock housing and said interlocking tongue; and
c) said adherent security seam includes an adhesive-receiving void defined between at least one of said radially outer covering leg and said end face of said interlocking tongue and between said end face of said radially outer covering leg and said interlocking tongue.

4. A bellows as defined in claim 1, wherein:
a) said at least one jointing closure defines a tangent plane;
b) said radially outer covering leg includes a radially inner surface;
c) a first opening angle is defined between said inner surface and said tangent plane, said first opening angle being in the range of about 5 to 30 degrees;
d) said supporting sole defines a radially outer surface; and
e) a second opening angle is defined between said outer surface of said supporting sole and said tangent plane, said second opening angle being in the range of about 1 to 10 degrees.

5. A bellows as defined in claim 1, wherein:
a) said at least one jointing closure defines a tangent plane; and b) an attack angle is defined between each said jet breaker surface and said tangent plane, said attack angle being in the range of about 40 to 50 degrees.

6. A bellows as defined in claim 1, wherein:
a) entry and exit sleeves are disposed on said tubular body; and
b) a terminal closure wall is disposed between each said entry and exit sleeve and said at least one jointing closure.

7. A bellows as defined in claim 1, wherein:
a) said tubular body includes a thermoplastic elastomer material; and
b) a liquid adhesive for preventing degradation of said thermoplastic elastomer material is disposed along said at least one jointing closure.

8. A bellows as defined in claim 1, wherein:
a) entry and exit sleeves are disposed on said tubular body;
b) an annular entry sealing joint is disposed in said entry sleeve, said entry joint mating with said entry sleeve; and
c) an annular exit sealing joint is disposed in said exit sleeve, said entry joint mating with said exit sleeve.

9. A bellows as defined in claim 1, wherein:
a) means is provided for defining a snap-lockable support between said radially outer covering leg and said interlocking tongue; and
b) said snap-lockable means includes an abutment disposed on said interlocking tongue, said abutment being configured for engaging said radially outer covering leg.

10. A bellows as defined in claim 1, wherein:
a) said interlocking tongue includes an entering tongue end face configured for being received in said interlock housing between said radially outer covering leg and said supporting sole; and
b) a lip extension is disposed on said interlocking tongue and extends beyond said entering tongue end face.

11. A rapid-assembly, flexible, sealing bellows for protecting jointed couplings, said bellows comprising:
a) a corrugated tubular body having entry and exit sleeves;
b) at least one jointing closure defined by adjacent divided edges of said tubular body, said edges running in a substantially longitudinal direction from said entry sleeve to said exit sleeve of said tubular body;
c) a first one of said edges defining a U-shaped interlock housing;
d) said interlock housing including:
i) a radially outer covering leg which is inclined in a radially outwardly extending direction, which defines a radially outer covering surface, and which has an end face; and
ii) a supporting sole defining a radially inner covering surface which extends circumferentially beyond said radially outer covering surface, which is radially inwardly inclined, and which has an end face;
e) a second one of said edges defining an interlocking tongue receivable in said interlock housing;
f) said interlocking tongue including:
i) a radially outer depth abutment which abuts said end face of said outer covering leg; and
ii) a radially inward depth abutment which abuts said end face of said supporting sole;

g) means for defining water jet breakers, said water jet breaker means including:
  i) a radially outwardly inclined outer face disposed on said interlock housing; and
  ii) a radially inwardly inclined outer face disposed on said interlocking tongue; and
h) wherein, when said interlocking tongue is received in said U-shaped interlock housing, said radially outwardly inclined outer face functions as a water jet breaker surface for rain water projected in a first rotational direction, and said radially inwardly inclined outer face functions as a water jet breaker surface for rain water projected in a second rotational direction, the second rotational direction being opposite to the first rotational direction.

12. A bellows as defined in claim 11, wherein:
a) said corrugated tubular body includes two hemispherical, semi-tubular shell halves;
b) said at least one jointing closure includes a first closure and a second closure;
c) said first closure is substantially diametrically opposed to said second closure; and
d) said first and second closures extend into said entry and exit sleeves.

13. A bellows as defined in claim 11, wherein:
a) said interlocking tongue includes an end face;
b) an adherent security seam is disposed between said U-shaped interlock housing and aid interlocking tongue; and
c) said adherent security seam includes an adhesive-receiving void defined between at least one of said radially outer covering leg and said end face of said interlocking tongue and between said end face of said radially outer covering leg and said interlocking tongue.

14. A bellows as defined in claim 11, wherein:
a) said at least one jointing closure defines a tangent plane;
b) said radially outer covering leg includes a radially inner surface;
c) a first opening angle is defined between said inner surface and said tangent plane, said first opening angle being about 10 degrees;
d) said supporting sole defines a radially outer surface; and
e) a second opening angle is defined between said outer surface of said supporting sole and said tangent plane, said second opening angle being about 3 degrees.

15. A bellows as defined in claim 11, wherein:
a) said at least one jointing closure defines a tangent plane; and
b) an attack angle is defined between each said jet breaker surface and said tangent plane, said attack angle being about 45 degrees.

16. A bellows as defined in claim 11, wherein:
a) a terminal closure wall is disposed between each said entry and exit sleeve and said at least one jointing closure.

17. A bellows as defined in claim 11, wherein:
a) said corrugated tubular body includes a thermoplastic elastomer material;
b) said elastomer material includes a polyether-block-amide; and
c) a liquid adhesive for preventing degradation of said thermoplastic elastomer material is disposed along said at least one jointing closure.

18. A bellows as defined in claim 11, wherein:
a) an annular entry sealing joint is disposed in said entry sleeve, said entry joint mating with said entry sleeve; and
b) an annular exit sealing joint is disposed in said exit sleeve, said entry joint mating with said exit sleeve.

19. A bellows as defined in claim 11, wherein:
a) means is provided for defining a snap-lockable support between said radially outer covering leg and said interlocking tongue; and
b) said snap-lockable means includes an abutment disposed on said interlocking tongue, said abutment being configured for engaging said radially outer covering leg.

20. A bellows as defined in claim 11, wherein:
a) said interlocking tongue includes an entering tongue end face configured for being received in said interlock housing between said radially outer covering leg and said supporting sole;
b) a lip extension is disposed on said interlocking tongue and extends beyond said entering tongue end face; and
c) said lip extension includes substantially parallel outer and inner surfaces.

* * * * *